US008157282B1

(12) United States Patent
Hutto

(10) Patent No.: US 8,157,282 B1
(45) Date of Patent: Apr. 17, 2012

(54) MODULARIZED CYCLE FRAME AND ASSOCIATED METHODS

(76) Inventor: Arne T. Hutto, Edgewater, FL (US)

( * ) Notice: Subject to any disclaimer, the term of this patent is extended or adjusted under 35 U.S.C. 154(b) by 620 days.

(21) Appl. No.: 11/419,319

(22) Filed: May 19, 2006

Related U.S. Application Data

(60) Provisional application No. 60/682,635, filed on May 19, 2005.

(51) Int. Cl.
*B62K 13/08* (2006.01)

(52) U.S. Cl. ........................................ 280/278; 280/287

(58) Field of Classification Search .................. 280/278, 280/287
See application file for complete search history.

(56) References Cited

U.S. PATENT DOCUMENTS

| | | | | |
|---|---|---|---|---|
| 490,844 | A * | 1/1893 | Draper | 280/287 |
| 1,428,496 | A * | 9/1922 | Roquefort-Villeneuve | 280/278 |
| 2,445,058 | A * | 7/1948 | Fields | 180/335 |
| 3,757,882 | A * | 9/1973 | Honda | 180/208 |
| 3,811,705 | A * | 5/1974 | D'Ambra | 280/279 |
| 3,854,755 | A * | 12/1974 | Tang | 280/278 |
| 3,865,403 | A * | 2/1975 | Majerus | 280/287 |
| 3,872,944 | A * | 3/1975 | Shapiro et al. | 180/208 |
| 3,945,463 | A * | 3/1976 | Okano et al. | 184/6.13 |
| 4,162,797 | A | 7/1979 | McBride | |
| 4,378,857 | A | 4/1983 | Andersson | |
| 4,388,978 | A | 6/1983 | Fior | |
| 4,540,190 | A * | 9/1985 | Moulton | 280/278 |
| 4,582,335 | A * | 4/1986 | Paioli et al. | 280/278 |
| 4,600,207 | A | 7/1986 | Zosi | |
| 4,909,537 | A * | 3/1990 | Tratner | 280/278 |
| 5,052,706 | A * | 10/1991 | Tsai et al. | 280/287 |
| 5,284,221 | A * | 2/1994 | Warne | 180/219 |
| 5,348,112 | A | 9/1994 | Vaillancourt | |
| 6,135,478 | A * | 10/2000 | Montague | 280/287 |
| 6,402,175 | B1 | 6/2002 | Jansson | |
| 6,497,426 | B2 * | 12/2002 | VanPelt | 280/287 |
| 6,505,847 | B1 | 1/2003 | Greene | |
| 6,786,499 | B2 | 9/2004 | Ackley | |
| 6,886,845 | B2 * | 5/2005 | Chao | 280/278 |

FOREIGN PATENT DOCUMENTS

| | | |
|---|---|---|
| JP | 60213577 A * | 10/1985 |

* cited by examiner

*Primary Examiner* — Joanne Silbermann
*Assistant Examiner* — Daniel Yeagley
(74) *Attorney, Agent, or Firm* — Allen, Dyer, Doppelt, Milbrath & Gilchrist, P.A.

(57) ABSTRACT

A cycle frame includes a back frame section and a front frame section. The back frame section has a bottom, substantially horizontal member and a top, substantially horizontal member. The back frame section also has a rear, substantially vertical member that is affixed at bottom and top ends to respective rear ends of the bottom and top members. The front frame section has a top frame member having a rear end that is releasably affixable to a front end of the back frame top member. A front frame member has a bottom end that is releasably affixable to a front end of the bottom member. A frame neck is affixed in bridging relation to the top and the front frame members. Thus the present invention achieves the front frame section's being interchangeable with another front frame section.

13 Claims, 2 Drawing Sheets

10 11 12 13 14 15 16 17 18 19 20 21 22 23 24 25 26 27 27 28 28' 29 29' 30 30' 31

MODULARIZED CYCLE FRAME AND ASSOCIATED METHODS

CROSS-REFERENCE TO RELATED APPLICATION

This application claims priority to provisional application Ser. No. 60/682,635, filed May 19, 2005, entitled "Modularized Cycle Frame and Associated Methods."

BACKGROUND OF THE INVENTION

1. Field of the Invention

The present invention relates to cycles such as motorcycles and bicycles, and methods for constructing same, and, more particularly, to such cycles that have interchangeable frame sections, including interchangeable front ends.

2. Description of Related Art

Motorcycle enthusiasts frequently possess multiple cycles, having different appearances, in order to present different "looks" and riding experiences. This can become very expensive, however, since each cycle, whether it be a motorcycle or bicycle, has to be bought and maintained separately.

An exercise tricycle that has an adjustable neck angle is known in the art. A motorcycle is also known that has an adjustable angle of the steering column to the frame on a motorcycle. Another motorcycle is known that has a pivoting neck. It is also known to purchase and install custom cycle parts.

SUMMARY OF THE INVENTION

The present invention is directed to a cycle frame. The cycle frame comprises a back frame section and a front frame section. The back frame section has a bottom, substantially horizontal member and a top, substantially horizontal member. The back frame section also has a rear, substantially vertical member that is affixed at bottom and top ends to respective rear ends of the bottom and top members.

The front frame section has a top frame member having a rear end that is releasably affixable to a front end of the back frame top member. A front frame member has a bottom end that is releasably affixable to a front end of the bottom member. A frame neck is affixed in bridging relation to the top and the front frame members. Thus the present invention achieves the front frame section's being interchangeable with another front frame section.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
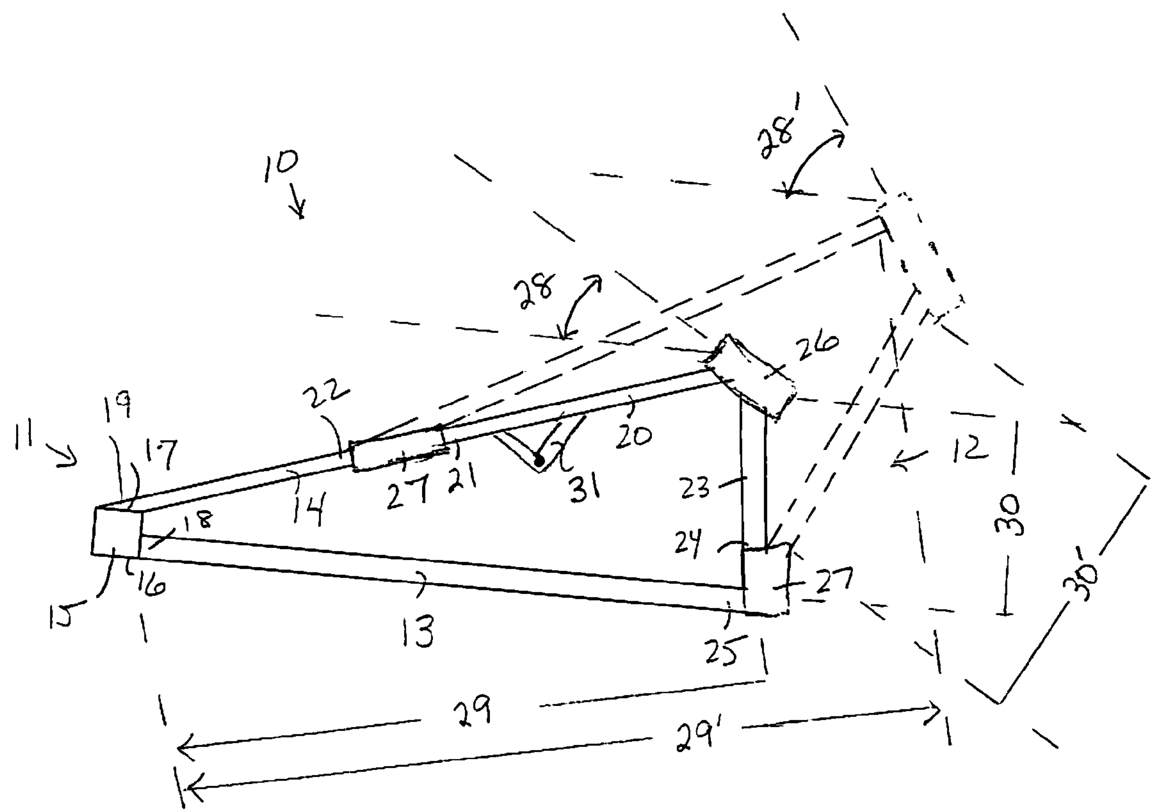
FIG. 1 is a cross-sectional view of an exemplary frame of the present invention, illustrating two different configurations thereof.

A description of the preferred embodiments of the present invention will now be presented with reference to FIGS. 1-6.

The cycle frame 10 of the present invention is designed for modularity. The cycle frame 10 comprises a back frame section 11 and a front frame section 12. The back frame section 11 is used to mount the engine, transmission, primary drive, the swing arm, and rear wheel. It is intended that the frame 10 be a substantially constant element of the cycles of the present invention.

The back frame section 11 has a bottom, substantially horizontal member 13 and a top upwardly angled member 14. The back frame section 11 also has a rear, substantially vertical member 15 that is affixed at bottom 16 and top 17 ends to respective rear ends 18,19 of the bottom 13 and top 14 members.

The front frame section 12 houses the steering stem neck bearings, the front end "fork," handlebars, front wheel, and brakes. The front frame section 12 has a top frame member 20 that has a rear end 21 that is releasably affixable to a front end 22 of the back frame top member 14. A front frame member 23 has a bottom end 24 that is releasably affixable to a front end 25 of the bottom member 13. A frame neck 26 is affixed in bridging relation to the top 20 and the front 23 frame members. The releasability of the front 12 from the rear 11 frame section is achieved by means of fasteners 27. A motor mount 31 is also provided on the top frame member 20, typically adjacent the rear end 21.

It may be seen by one of skill in the art that one can achieve a cycle having a different "rake," that is, the angle 28,28' of the frame neck 26, and also a different "stretch," that is, the total lengths 29,29';30,30' of the tops of the frame 14,20 and of the front frame member 23.

Thus the present invention achieves the front frame section's being interchangeable with another front frame section, saving the rider significantly in the cost of owning and maintaining multiple cycles, since the rider can own a unitary back frame and working elements (engine, transmission, etc.). The cycle is also completely customizable, so that the rider's height and arm position can be accommodated as desired.

Figure 2:
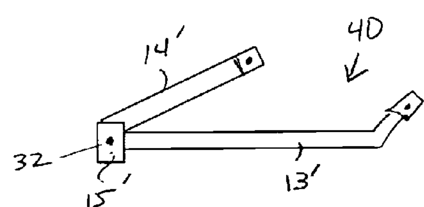
FIG. 2 is a side view of a ridged "hard tail" solid frame with not suspension.
Figure 3:
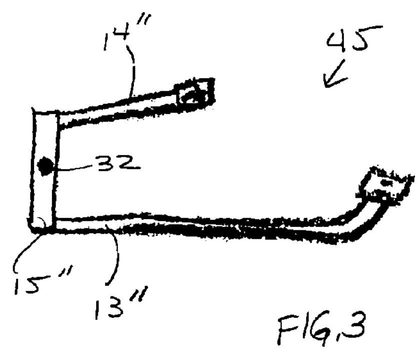
FIG. 3 is a side view of a "soft tail" swing-arm frame.

Alternate embodiments are also provided for the rear and front sections. For the rear section, for example, three sub-embodiments are provided. In FIG. 2 is depicted a ridged "hard tail," comprising a solid frame 40 with no suspension. In FIG. 3 is depicted a swing-arm "soft tail" frame 45 comprising a single tube 45 with a pivot bolt 32 located in the vertical member 15', connecting the horizontal 13' and upwardly angled 14' members. Similarly, a "soft tail" swing arm frame 50 (FIG. 4) is provided with a longer vertical member 15" connecting the horizontal 13" and upwardly angled 14" members.

Figure 4:
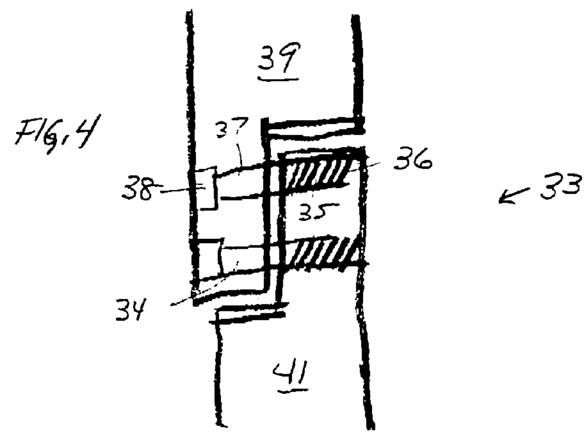
FIG. 4 illustrates an exemplary connection system for the modules.

Connections to other modules are provided at the ends of the members 13,14 and 13",14" via connectors 33, and an exemplary method of connection is illustrated in FIG. 4, wherein countersunk bolts 34 having threads 35 at a distal end 36 and a non-threaded portion 37 adjacent the head 38. The heads 38 are adjacent the outside of the connection, and the distal end 36, adjacent the inside of the connection. The top section 39 comprises the top/rear section; the bottom section 41, the bottom/front section.

In the single-sided aircraft embodiment 60 (FIG. 5), left or right drive can be used, and, again, the swing arm 61 is attached by a pivot bolt 62 to the frame assembly 60, and also twin shocks 63 are attached to the frame 60 in side-by-side fashion. These embodiments are not intended as limitations, and a virtually unlimited number of other variations of the swing arm and shape designs are possible, as will be understood by one of skill in the art. Although right-side-drive option is not typical of stock frames, it would be possible with the present invention to incorporate this option.

Figure 5:
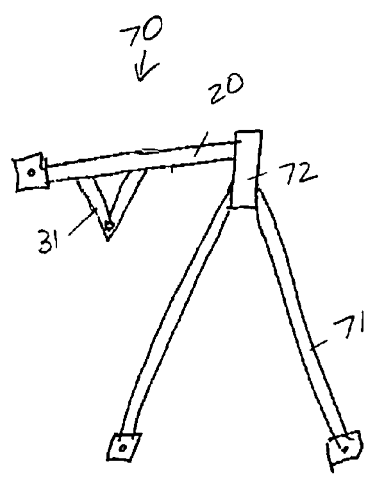
FIG. 5 is a front view of a standard stock front section having dual down-tubes.
Figure 6:
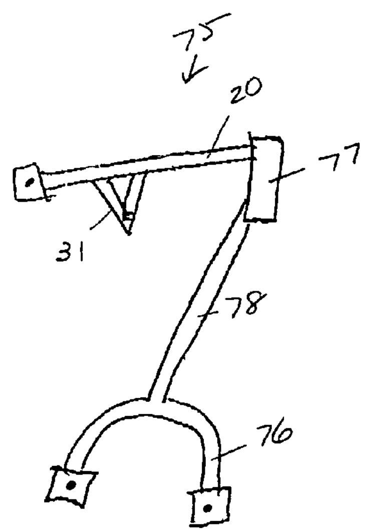
FIG. 6 is a front view of a standard stock front section having a dual "wishbone."

The invention also contemplates multiple embodiments of the front section of a frame (FIGS. 5 and 6). The front section 70 of FIG. 5 has dual straight-leg down-tubes 71 extending from the neck 72. The front section 75 of FIG. 6 has dual "wishbone" down-tubes 76 extending from a single down-tube 78, itself extending from the neck 77.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A motorcycle frame comprising:

a first back frame section having a back frame bottom member and a back frame top member, wherein the back frame top member is extending forwardly and upwardly from a rear end of the back frame bottom member; and a first front frame section having a first front frame top member extending rearwardly from a first neck and releasably connected to a forward end of the back frame top member, and a first front frame front member extending downwardly from the first neck and releasably connected to the forward end of the back frame bottom member, wherein the first front frame section comprises a first front frame rake angle;

the motorcycle frame first back frame section is configured to be selectively detached from the first front frame section by selectively detaching the forward ends of the back frame top member and the back frame bottom member from the first front frame top member and the first front frame front member of the first front frame section and removably disconnecting the first front frame section from the first back frame section;

wherein a second front frame section having a second front frame top member extending rearwardly from a second neck and releasably connectable to the forward end of the back frame top member, and a second front frame front member extending downwardly from the second neck and releasably connectable to the forward end of the back frame bottom member of the first back frame section, wherein the second front frame section comprises a second front frame rake angle that is different from that of the first front frame rake angle and is selectively attached to the forwards end of the first back frame section to connect the second front frame section to the first back frame section to result in a motorcycle frame having a different angle than the first front frame section when connected to the first back frame section.

2. The motorcycle frame of claim 1, wherein the first front frame section can be removed and replaced without dismounting the engine, transmission and primary drive from the back frame section.

3. The motorcycle frame of claim 1, wherein the back frame section further includes a back frame rear member extending between top and bottom ends, the top end being affixed to the rear end of the back frame top member and the bottom end being affixed to the rear end of the back frame bottom member.

4. The motorcycle frame of claim 1, wherein the back frame top and bottom members and the front frame top and front members are unitary members.

5. The motorcycle frame of claim 1, wherein the first front frame top and front members both extend from the first neck at permanently fixed angles.

6. A modular motorcycle frame kit comprising the motorcycle frame of claim 1, and further comprising the second front frame section interchangeable with the first front frame section, wherein interchanging the first and second front frame sections results in a different rake and stretch for the resulting motorcycle frame.

7. The motorcycle frame kit of claim 6, wherein the rake and stretch of the resulting motorcycle frame with either the first or second front frame sections is fixed.

8. A modularized motorcycle frame kit comprising:

a first back frame section having a back frame bottom member, and a back frame top member extending forwardly and upwardly from a rear end of the back frame bottom member;

a first front frame section having a first front frame top member extending rearwardly from a first neck and releasably connectable to a forward end of the back frame top member, and a first front frame front member extending downwardly from the first neck and releasably connectable to a forward end of the back frame bottom member, wherein the first front frame section comprises a first front frame rake angle; and a second front frame section having a second front frame top member extending rearwardly from a second neck and releasably connectable to the forward end of the back frame top member, and a second front frame front member extending downwardly from the second neck and releasably connectable to the forward end of the back frame bottom member, wherein the second front frame section comprises a second front frame rake angle that is different from that of the first front frame rake angle;

wherein a first angle between the first front frame top member and the first front frame front member are permanently fixed and a second angle between the second front frame top member and second front frame front member are permanently fixed and different from that of the first angle between the first front frame top member and first front frame front member;

the motorcycle frame first back frame section is configured to be selectively detached from the first front frame section by selectively detaching the forward ends of the back frame top member and the back frame bottom member from the first front frame top member and the first front frame front member of the first front frame section and removably disconnecting the first front frame section from the first back frame section;

wherein the second front frame section having the second front frame top member extending rearwardly from a second neck is releasably connectable to the forward end of the back frame top member, and the second front frame front member extending downwardly from the second neck is releasably connectable to the forward end of the back frame bottom member of the first back frame section, wherein when the second front frame section is connected to the first back frame section, the resulting motorcycle frame obtains a different rake angle than that of the first front frame section when connected to the first back frame section.

9. The motorcycle frame kit of claim 8, wherein the back frame section further includes a back frame rear member extending between top and bottom ends, the top end being affixed to the rear end of the back frame top member and the bottom end being affixed to the rear end of the back frame bottom member.

10. The motorcycle frame kit of claim 8, wherein the back frame section is adapted to mount an engine, transmission and primary drive of a motorcycle thereon such that the first and second front frame sections can be interchanged without dismounting the engine, transmission and primary drive from the back frame section.

11. The motorcycle frame kit of claim 8, wherein the back frame top and bottom members, the first and second front frame top and front members and the first and second frame necks are all unitary members.

12. The motorcycle frame kit of claim 8, wherein the first front frame top and front members both extend from the first neck at permanently fixed angles and the second front frame top and front members both extend from the second neck at permanently fixed angles.

13. A method of modifying a modularized motorcycle frame, the method comprising:

detaching first front frame top and front members of a first front frame section from forward ends of back frame top and bottom members of a back frame section of the motorcycle frame, such that a motorcycle engine, transmission and primary drive remain attached to the back frame section;

selecting a second front frame section having second front frame top and front members that, when attached to the forward ends of the back frame top and bottom members, will necessarily result in a different rake and stretch of the motorcycle frame than with the first front frame section attached;

attaching the second front frame section to the back frame section such that connection angles with the second front frame top and front members and the forward ends of the back frame top and bottom members will both necessarily be different than with the first front frame top and front members.

* * * * *

UNITED STATES PATENT AND TRADEMARK OFFICE

CERTIFICATE OF CORRECTION

PATENT NO. : 8,157,282 B1
APPLICATION NO. : 11/419319
DATED : April 17, 2012
INVENTOR(S) : Arne T. Hutto It is certified that error appears in the above-identified patent and that said Letters Patent is hereby corrected as shown below:

IN THE SPECIFICATIONS:

Column 2, Line 6 — Delete: “dual “wishbone”
Insert: -- single down-tube --

Column 2, Line 52 — Delete: “three”
Insert: -- two --

Column 2, Line 56 — Delete: “single tube”
Insert: -- side frame --

Column 2, Lines 58-61 — Delete: “Similarly, a “soft tail” swing arm frame 50 (FIG. 4) is provided with a longer vertical member 15" connecting the horizontal 13" and upwardly angled 14" members.”

Column 3, Lines 4-8 — Delete: “In the single-sided aircraft embodiment 60 (FIG. 5), left or right drive can be used, and, again, the swing arm 61 is attached by a pivot bolt 62 to the frame assembly 60, and also twin shocks 63 are attached to the frame 60 in side-by-side fashion.”

Column 3, Lines 18-19 — Delete: “dual wishbone down tubes 76 extending from”

Signed and Sealed this
Seventh Day of August, 2012

David J. Kappos
*Director of the United States Patent and Trademark Office*